United States Patent [19]

Parker

[11] Patent Number: 5,074,826

[45] Date of Patent: Dec. 24, 1991

[54] VARIABLE SPEED TRANSMISSION

[75] Inventor: David E. Parker, Clemmons, N.C.

[73] Assignee: Fairchild Industrial Products Company, Winston-Salem, N.C.

[21] Appl. No.: 631,442

[22] Filed: Dec. 21, 1990

[51] Int. Cl.⁵ .......................................... F16H 55/17
[52] U.S. Cl. .............................................. 474/47
[58] Field of Search ............ 474/8, 11, 12, 17, 25–27, 474/47–50, 52, 53, 56, 57

[56] References Cited

U.S. PATENT DOCUMENTS 3,604,282  9/1971  Shambaugh ........................... 474/47

FOREIGN PATENT DOCUMENTS 0663180  7/1938  Fed. Rep. of Germany ........ 474/47
JPX  6/1988  Japan ..................................... 474/49

*Primary Examiner*—Thuy M. Bui
*Attorney, Agent, or Firm*—Michael W. York

[57] ABSTRACT

A variable speed transmission in which the output speed is infinitely adjustable within a given speed range and is accurately controlled. The variable speed transmission includes two pulley assemblies that are rotatably connected by an endless chain, control levers and a control screw for varying the effective pitch radius of at least one of the pulley assemblies and the associated chain. The output from one of the pulley assemblies serves as the elliptical ball bearing assembly input that serves to deform a nonrigid external gear of a flexible gear assembly. The output from the other pulley assembly through gears controls a round rigid internal gear that intermittently meshes with the nonrigid external gear. This arrangement provides extremely accurate speed control of the output from the flexible gear assembly that comes form the nonrigid external gear. The pulley assemblies, the endless chain, control levers, and the flexible gear assembly are located within the same compact hollow unitary housing.

10 Claims, 2 Drawing Sheets 5,074,826

VARIABLE SPEED TRANSMISSION

BACKGROUND OF THE INVENTION

Variable speed transmissions have been in use for many years. Typically such a transmission will use two pulleys each having opposing wheelfaces and an endless member such as a chain or a rubber belt that engages the wheelfaces. The wheelfaces can be moved apart or together to very the radial location of the belt or chain on the wheelfaces.

One such variable speed transmission uses a metal chain containing packages of slats, which engage themselves in grooved wheelfaces and thus effectively provide a variable pitch all metal chain. This chain positions itself and establishes a pitch radius in the wheelfaces depending upon the opening between the wheelfaces. If the wheelfaces are moved close together, the chain rides out near the top of the wheelfaces and establishes itself with a relatively large pitch diameter. If the wheel faces are moved apart, the chain rides down near the center of the wheelfaces, establishing a relatively small pitch diameter. The resultant speed relationship between the variable speed shaft of the unit and the constant speed shaft of the unit is a function of the ratio of the pitch diameters of the chain at the variable speed grooved wheels and the constant speed grooved wheels.

Control levers and a control screw are provided to permit the wheelfaces to be adjusted in and out to an infinite number of positions and thus an infinite number of pitch diameter ratios can be established. This means that the transmission is infinitely adjustable from maximum rated speed down to minimum rated speed. The unit can be set to operate at any speed setting between the maximum and minimum speed ratings.

In the past such a variable speed transmission has been coupled to a bevel gear differential which has increased the accuracy of the basic pulley and belt or chain combination. However, even this combination does not provide sufficient accuracy for many applications. In addition, such a resulting combination is fairly complex.

The present invention overcomes these problems and offers numerous advantages over previous variable speed transmissions. With this invention it is possible to provide very narrow output speed regulation with very high accuracy. This invention essentially has zero backlash which is not possible with previous variable speed transmissions and hence the new variable speed transmission has very superior output accuracy. The present invention is also more compact and lighter in weight than previous variable speed transmission combinations and it offers greater ease in manufacturing, servicing and repair. The present invention's precision performance characteristics are ideal for accurate and precise control and provide a variable speed transmission that is readily adaptable for use in a variety of applications.

SUMMARY OF THE INVENTION

This invention relates to variable speed transmissions and in particular to variable speed transmissions that utilize pulleys and an endless member interconnecting the pulleys.

It is accordingly an object of the invention to provide speed transmission with an increased speed regulation range.

It is an object of the invention to provide a variable speed transmission that has increased accuracy.

It is an object of the invention to provide a variable speed transmission that has substantially no backlash.

It is an object of the invention to provide a variable speed transmission that has a narrow speed regulation capability.

It is an object of the invention to provide a variable speed transmission that has an increased number of applications.

It is an object of the invention to provide a variable speed transmission that has increased reliability.

It is an object of the invention to provide a variable speed transmission that has reduced complexity.

It is also an object of the invention to provide a variable speed transmission that has less complex parts.

It is also an object of the invention to provide a variable speed transmission that is more compact.

It is an object of the invention to provide a variable speed transmission that is lighter in weight.

It is an object of the invention to provide a variable speed transmission that is easier to maintain and repair.

It is an object of the invention to provide a variable speed transmission that is easy to manufacture.

It is an object of the invention to provide a variable speed transmission that has fewer moving parts.

It is an object of the invention to provide a variable speed transmission that is less expensive to manufacture.

It is an object of the invention to provide a variable speed transmission that is simple in its operation.

It is also an object of the invention to provide a variable speed transmission that has an increased operational life.

It is also an object of the invention to provide a variable speed transmission that is very reliable.

These and other objects are obtained from the variable speed transmission invention that includes two pulley assemblies that are rotatably interconnected by an endless chain. Such pulley assembly includes two wheels with tapering wheel surfaces that face each other and are contacted by the chain. A control assembly is provided that controls the distance between the wheel faces of at least one wheel assembly and hence the effective pitch radius for the chain and that wheel assembly. The pulley assemblies have both a fixed speed output and a variable speed output. The fixed speed output serves as the elliptical ball bearing assembly input to flexible gear assembly and the variable speed output serves as an input to a rigid internal gear of the flexible gear assembly which provides for very accurate speed control of the output from a nonrigid external gear from the flexible gear assembly.

BRIEF DESCRIPTION OF THE DRAWINGS

The invention will be hereinafter described in greater detail with reference to the appended drawings in which.

DETAILED DESCRIPTION OF THE PREFERRED EMBODIMENT

Figure 1:
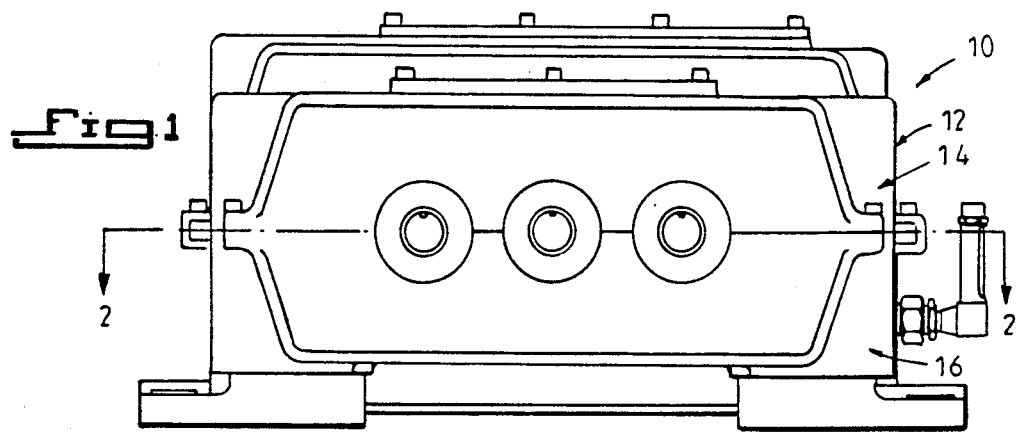
FIG. 1 is a side elevational view of the variable speed transmission invention.
Figure 2:
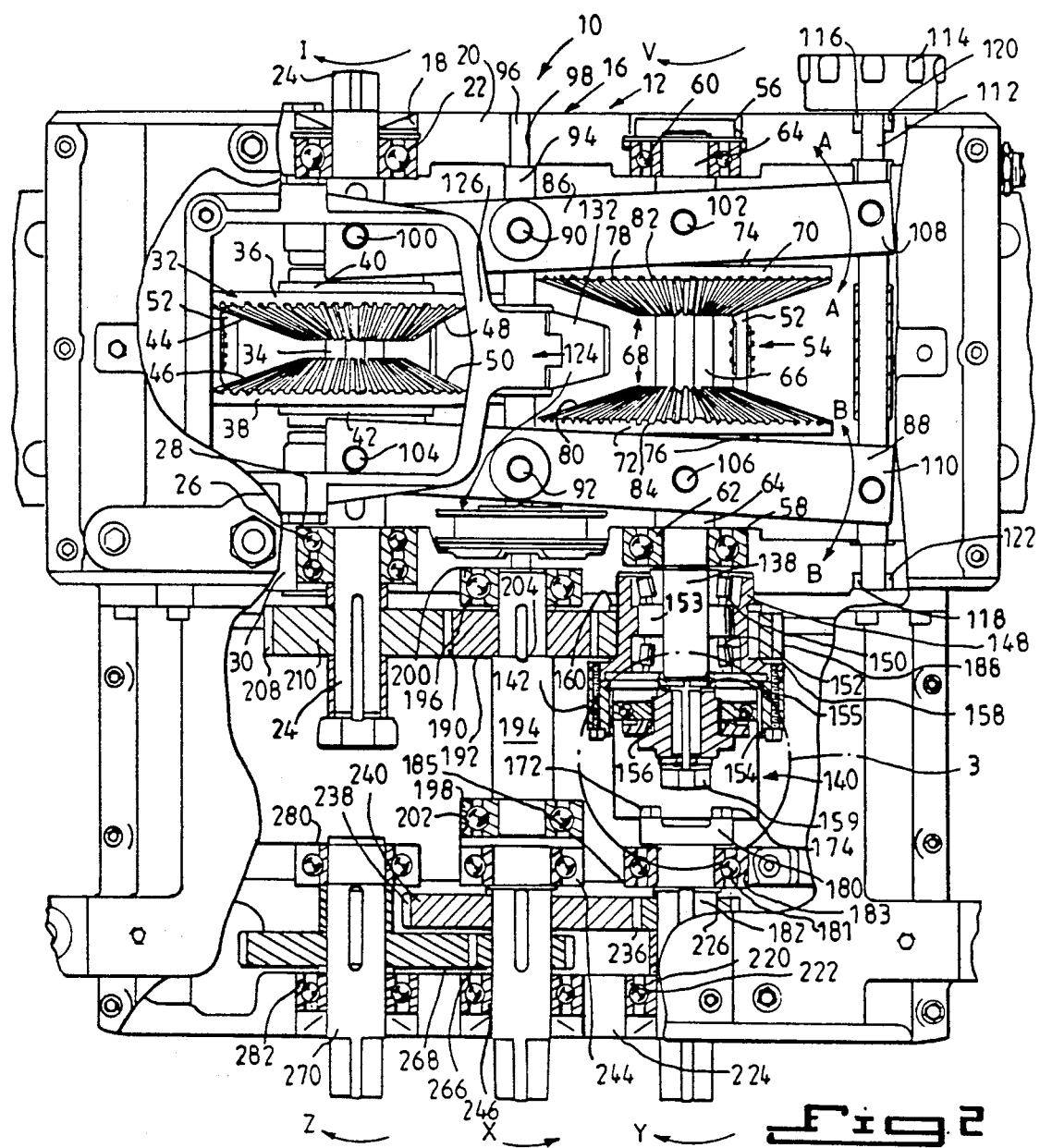
FIG. 2 is a sectional view of the variable speed transmission invention taken substantially on the line 2—2 in FIG. 1, with a portion of upper housing still visible.

Referring first to FIGS. 1 and 2 the variable speed transmission invention is illustrated and is designated generally by the number 10. The variable speed transmission 10 comprises a hollow housing 12 that is split in two into an upper housing 14 and a lower housing 16. As illustrated in FIG. 2 a circular shaped hole 18 is located in the side 20 of the housing 12 that has a bearing 22 in which an input shaft 24 is rotatably mounted. The input shaft 24 is also rotatably mounted in the bearing 26 that is located in a hole 28 in an interior wall 30 in the housing 12. A pulley assembly 32 is mounted on the center portion 34 of the input shaft 24 and comprises two substantially identical wheels 36 and 38 and two thrust bearings 40 and 42 located on the outside of the wheels 36 and 38. The wheels 36 and 38 are mounted on the center portion 34 of the input shaft 24 in a conventional manner so that they rotate with the shaft but the wheels 36 and 38 can move lengthwise on the center portion 34 of the shaft 24. It will be noted that the inner substantially identical faces 44 and 46 of the wheels 36 and 38 taper outward and have radial grooves 48 and 50 in them that are engaged by members 52 of an endless chain 54.

As illustrated in FIG. 2, additional holes 56 and 58 are located in the respective walls 20 and 30 that have bearings 60 and 62 that serve to rotatably mount a variable speed shaft 64. This variable speed shaft 64 has a center section 66 on which a second pulley assembly 68 is mounted that is substantially identical to the first pulley assembly 32. This pulley assembly 68 has two wheels 70 and 72 and thrust bearings 74 and 76 located outside the wheel members 70 and 72 that are all mounted on the center portion 66 of the shaft 64. The wheels 70 and 72 are mounted on the center portion 66 of the shaft 64 in a conventional manner so that they rotate with the shaft 64 but the wheels can move lengthwise on the center portion of the shaft 64.

The inner substantially identical inner faces 78 and 80 of the respective wheels 70 and 72 taper outward and have respective radial grooves 82 and 84 that are engaged by the members 52 of the endless chain 54 in a manner similar to the grooves 48 and 50 of the faces 44 and 46 of the wheels 36 and 38.

As also illustrated in FIG. 2, two substantially similar control arm members 86 and 88 are provided that are pivotally mounted on the respective pivot pins 90 and 92 that are connected to and extend from a mounting bar 94 that is rigidly mounted to the wall 20 of the housing portion 16 by having one end portion 96 of the bar 94 rigidly secured within the hole 98 in the wall 20. These control arm members 86 and 88 are also connected to the respective thrust bearings 40, 74, and 42, 76 by the respective connecting pins 100, 102 and 104, 106. The outer end portions 108 and 110 of the respective control arm members 86 and 88 are threadably connected to a control screw member 112 in such a manner that the manual turning of the handle portion 114 of the control screw member 112 results in either the outward or inward movement of the adjacent outer end portions 108 and 110 of the control arm members 86 and 88 as indicated by the respective arrows A and B. It will also be noted that the control screw member 112 rotates within the bearings 116 and 118 that are mounted in holes 120 and 122 in the respective housing walls 20 and 30.

As illustrated, an automatic chain tensioner 124 is provided for maintaining proper tension on the chain 54 even when the chain 54 is worn. The automatic chain tensioner and chain wear compensator includes a pair of pivotally mounted yoke members, with only the upper yoke member 126 being shown that is pivotally mounted on the pivot pins (not shown). Each yoke member, such as the member 126, has a pivotally mounted chain contact member 13 that is in contact with the chain 54 and exerts an inward force or force toward the shaft portions 34 and 66 on the chain 54 so as to maintain the correct tension on the chain 54. The chain contact members, such as the contact member 32 that is illustrated, are biased toward each other as a result of spring members (not shown) that exert an outward force on each yoke member, such as the yoke member 126. In view of this arrangement the chain 54 rotatably interconnects the pulley assembly 32 and the pulley assembly 68 so that the rotation of the variable speed shaft 64 in the same direction or in the direction indicated by the arrow V.

Figure 3:
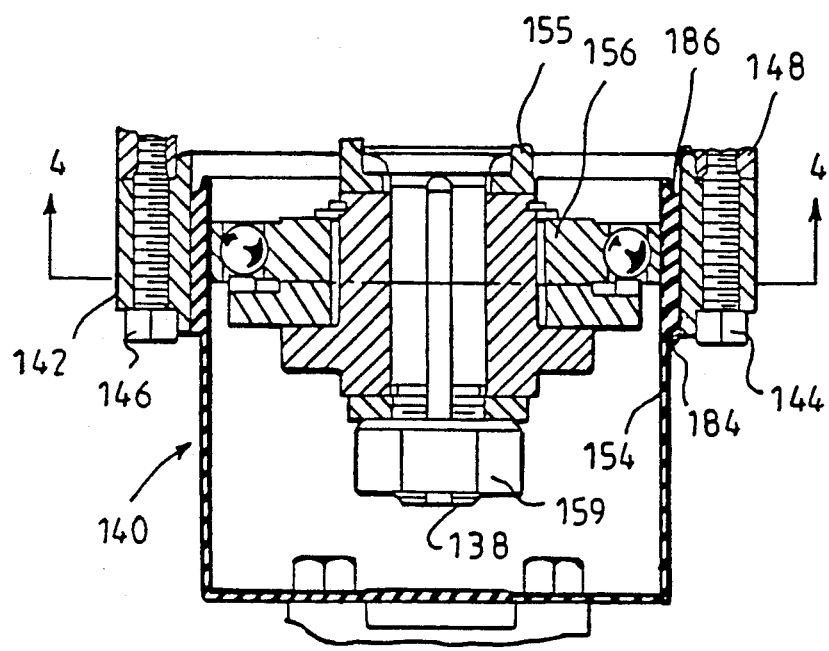
FIG. 3 is an enlarged view of a portion of the variable speed transmission illustrated in FIG. 2 taken substantially within the circle 3 thereof.
Figure 4:
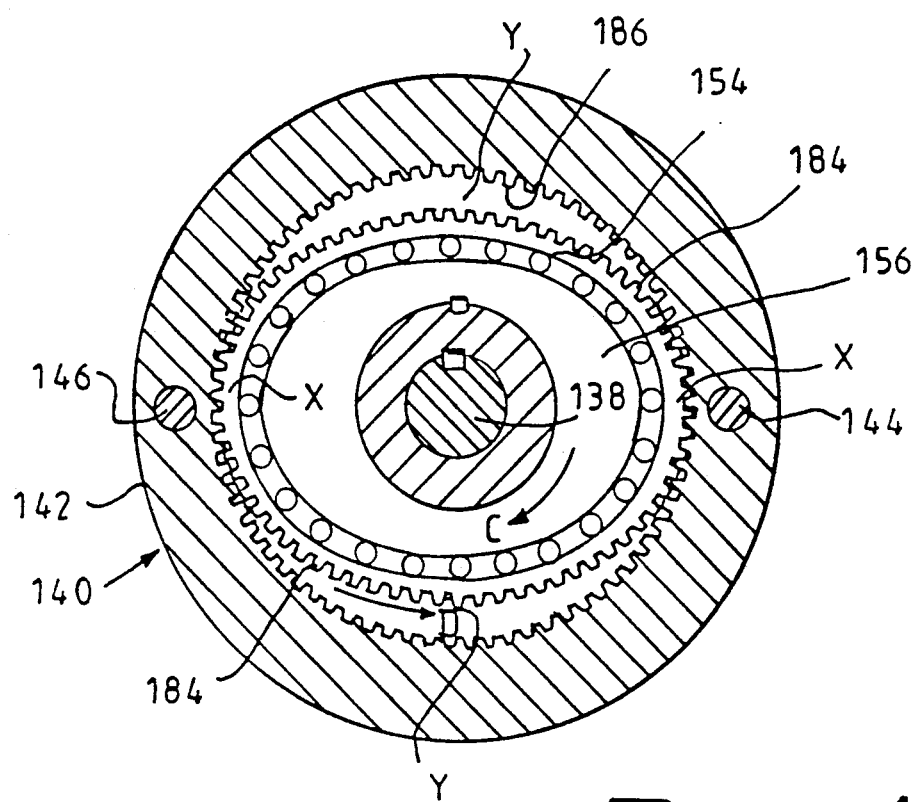
FIG. 4 is a view of the portion of the variable speed transmission illustrated in FIG. 3 taken substantially in the direction of the line 4—4 in FIG. 3.

As illustrated in FIG. 2, the variable speed shaft 64 has a reduced diameter output end portion 138 that serves as the input to a flexible gear assembly designated generally by the number 140. As illustrated in FIGS. 2, 3 and 4, the flexible gear assembly 140 comprises an outer substantially circular internal gear 142 that is secured by the bolts 144 and 146 to a rotatable mounting member 148 that is rotatably mounted on the end portion 138 of the shaft 64 by bearings 150 and 152 that are spaced apart from each other by the spacer 153. The flexible gear assembly 140 also comprises a flexible gear 154 that is rotatably mounted with a portion inside the internal gear 142 and an elliptical ball bearing assembly 156 that is located inside the flexible gear 154 in position to deform the flexible gear 154. A spacer 155 and threaded nut 159 is used to position the ball bearing assembly 156 on the end of this shaft 138.

An external gear 158 is rigidly secured to the mounting member 148 in a conventional manner and is secured in place by the clip 160 so that the mounting member 148 rotates when the gear 158 rotates. The elliptical ball bearing assembly 156 is secured to the outer end of the end portion 138 in a conventional manner keyway, key and threaded nut 159 combination so that rotation of the shaft 64 and its end portion 138 also causes corresponding rotation of the elliptical bearing assembly 156. The flexible gear 154 is shaped like a cup and is attached through holes (not shown) and respective bolts 172 and 174 to suitable threaded holes (not shown) in the mounting flange 180 of an output shaft 182 that is rotatably mounted in a bearing 181 located in a hole 183 in an interior housing wall 185. The flexible gear 154 has external flexible or deformable teeth 184 that are sized and shaped to intermitently mesh with the internal teeth 186 of the substantially circular internal gear 142.

FIG. 4 is an enlarged view in which certain proportions are slightly exaggerated to illustrate the principles of operation of the flexible gear assembly 140 and in particular the arrangement between the teeth 184 of the circular internal gear 142 and the teeth 186 of the flexible gear 154. As illustrated, there are two less teeth 186 on the flexible gear 154 than the number of teeth on the circular internal gear 142. Consequently, it is obvious that all of the teeth 184 could not mesh with the teeth 186 at the same time. However, as illustrated, the ball bearing assembly 156 is elliptical shaped and since this assembly 156 serves to deform the flexible gear 154 the flexible gear 154 also assumes this elliptical shape even though it is a rotating elliptical shape. As a consequence, the teeth 184 and 186 have two primary areas of engagement at the ends of the long elliptic axis at the positions designated by the letters X in FIG. 4 whereas at the ends of the minor elliptic axis designated by the letters Y the teeth 184 and 186 are fully disengaged. As a result of this arrangement with each rotation of the elliptic ball bearing assembly 156 the flexible gear 154 rotates two teeth 184 in the opposite direction indicated by the arrow D from the direction of rotation of the bearing assembly 156 indicated by the arrow C.

As illustrated in FIGS. 2 and 3, the input shaft 24 is also operatively connected to the substantially circular internal gear 142. This is a result of the fact that the external gear 158 which is connected to the internal gear 142 has teeth 188 that mesh with the teeth 190 of another external gear 192 that is mounted on the shaft 194 that is then rotatably mounted in the bearings 196 and 198 located in respective holes 200 and 202 in the respective interior housing walls 30 and 185. The gear 192 is fixed to the shaft 194 and is located in position by the shoulder 204. The teeth 190 of the external gear 192 in turn mesh with the teeth 208 of another external gear 210 that is fixed to and rotates with the shaft 24. As a result of this arrangement, rotation of the shaft 24 causes rotation of the gear 192 which in turn causes rotation of the gear 158 and the connected mounting member 148 and the connected circular internal gear 142. The rotation of the internal gear 142 is translated to the flexible gear 154 and from there to the output shaft 182. If the input via the gear 158 is ignored, the flexible gear 154 is rotating two teeth in the other direction for each rotation of the shaft 64 that rotates in the same direction as the shaft 24, the rotational speed of the shaft 182 is obviously less than the rotational speed of the internal gear 142.

As illustrated in FIG. 2, not only is the output shaft 182 rotatably mounted in the bearing 181, but the shaft 182 also rotates in the bearing 220 that is mounted in the hole 222 in the outside housing wall 224. An external gear 226 is fixed to the shaft 182 to rotate with it through the use of a conventional key and keyway in the shaft 182 and the gear is held in place on the shaft by conventional bushings. The teeth 236 of the gear 226 mesh with the teeth 238 of an external gear 240 that is mounted on the shaft 242 that is rotatably mounted in the bearings 244 and 246 that are located in appropriate holes in the housing walls 185 and 224. Another external gear 252 is also mounted on the shaft 242 outside the gear 240 and the gears 252 and 240 are held in position on the shaft 242 by suitable bushings. Both gears 240 and 252 are fixed to rotate with the shaft by a conventional key and keyway located in the shaft 242. The teeth 264 of the gear 252 mesh with the teeth 266 of an external gear 268 that is mounted on the shaft 270 by a conventional key and keyway on the shaft 270 so that the shaft rotates with the rotation of the gear 268. The gear 268 is positioned on the shaft 270 by the bushings and the shaft 270 rotates in bearings 280 and 282 that are mounted in the appropriate holes in the respective housing walls 185 and 224.

The variable speed transmission invention 10 is made in the following manner. The hollow housing 12 is made using standard casting and mechanical techniques from cast iron and is similar to other housings currently in use in connection with variable speed transmissions. However, in view of the use of the compact flexible gear assembly 140, the housing can be significantly smaller than other transmission housings. The pulley assemblies 32 and 68, the chain 54, the automatic chain tensioner 124, the control screw member 112 and the previously described associated components as well as the various bearings and shafts are commercially available from Fairchild Industrial Products Company of Winston-Salem, N.C. In a similar manner, the flexible gear assembly 140 is commercially available from Quincy Technologies, Inc., Harmonic Drive Division of Quincy Technologies, Inc. of Wakefield, Mass. and is know as the cup-type component gear set. However, the manner in which the flexible gear assembly 140 is combined with the previously mentioned pulley assemblies 32 and 68, the chain 54, automatic chain tensioner 124 and the control screw member 112 is unique.

The rotatable mounting member 148 is machined using conventional machinery techniques from high quality steel and the bearings 150 and 152, spacer 153 and bolts 144 and 146 are conventional as are the spacer 155 and the threaded nut 157. The gears 158, 192, and 210 and the associated shafts and bushings and the like are all conventional in nature and are made by conventional techniques known in the art from high quality carbon steel as are the gears 236, 240, 252, 268 and the associated shafts, bearings and bushings including the shaft 182 and its flange 180. It will, of course be appreciated that the size and number of teeth on these various gears as well as the pulley chain 54 size will be selected by one skilled in the art for the particular application in which the variable speed transmission 10 is to be used. It should be noted that although in the preferred embodiment of the invention the flexible gear assembly 140 has a two teeth difference in the number of the teeth 186 on the flexible gear 154 and the number of teeth 184 on the internal gear 142, other numbers of teeth differences can be used and will produce satisfactory results and the choice of a particular number of teeth difference will be apparent to those skilled in the art.

The variable speed transmission 10 is used in the following manner. The input shaft 24 end that extends outside the housing 12 is connected to a suitable input that also rotates in the direction of the arrow I and when the input is energized it causes rotation of the shaft 24 in the direction of the arrow I. This also causes the pulley assembly 32 to rotate in the same direction and in view of the chain 54 the pulley assembly 68 and the connected variable speed shaft 64 is caused to rotate in the same direction or in the direction of the arrow V. This rotation of the shaft 64 and its end portion 138 causes rotation of the conventional ball bearing assembly 156 which results in the intermitent engagement of the teeth 184 in the internal gear 142 and the teeth 186 on the flexible gear 154 that results in the opposite direction of rotation of the gear 154 at the rate of two teeth per revolution of the ball bearing assembly 156 if the input via the gear 158 is ignored. This rotation is, of course, translated to the connected output shaft 182. However, the shaft 182 also receives another input from the shaft 24 through the meshing gears 210, 192, and 158 that causes the opposite direction rotation of the mounting member 148 or rotation in the direction of the arrow V which also causes the flexible gear 154 to rotate in the same direction along with the connected output shaft 182. Since this output shaft 182 extends outside the housing wall 224, it can be used to drive machinery or the like.

As illustrated in FIG. 2, the gear 236 that is fixed to the shaft 182 also causes rotation of the gear 240 and its fixed shaft 242 which can also be used as an output shaft that rotates in the opposite direction from the shaft 182 and at a different speed. The gear 252 that is connected to the shaft 242 causes rotation of the associated gear 268 which is fixed to the shaft 270 and hence the shaft 270 rotates in a direction opposite the direction of the shaft 242 and at a different speed. Consequently, there are three output shafts 182, 242, and 270 that extend outside the housing wall 224 that rotate in the respective directions indicated by the respective arrows Y, X, and Z. One or more of these output shafts 182, 242, and/or 270 can be used to drive appropriate machinery or the like. The speeds of the shafts 242 and 270 can be selected by choosing the appropriate gears 236, 240, 252, and 268.

When it is desired to change or vary the output speed of the output shafts 182, 242, and 270, the handle portion 114 of the control screw member 112 is manually turned and this alters the effective pitch radius of the pulley assemblies 32 and 68 and the associated chain 54. This results in either an increase or a decrease in the speed of the shaft 64 and its shaft portion 138 in relation to the speed of the input shaft 24 depending upon the direction that the handle portion 114 is turned. If the handle portion 114 is turned to cause an increase in the speed of the shaft 64, this results in a decrease in the speed of the output shaft 182 and conversely if the handle portion 114 is turned to cause a decrease in the the speed of the shaft 64, this results in an increase in the speed of the output shaft 182.

It will be noted that the rotational input to the circular internal gear 142 through the intermeshed gears 210, 192, 158 and the rotatable mounting member 148 remains fixed or constant. Consequently, only the input to the ball bearing assembly 156 via the shaft portion 138 is varied which results in a change in the speed of rotation of the flexible gear 154. The reduction in speed from the speed of the shaft portion 138, which drives the ball bearing assembly 156, to the associated rotation of the flexible gear 154 is equal to the number of teeth on the flexible gear 154 divided by two. This provides a high reduction ratio with a very narrow output speed regulation capability.

The construction of the flexible gear assembly 140 is such that is provides a very high mechanical efficiency. In addition, the flexible gear assembly has essentially zero backlash in view of the arrangement of the teeth 186 on the flexible gear 154 and the associated teeth 186 on the circular internal gear 142. As a consequence, very superior output accuracy is possible through the use of the flexible gear assembly 140. The flexible gear assembly also permits high torque transmission in comparison to its weight.

Although the invention has been described in considerable detail with reference to a certain preferred embodiment, it will be understood and appreciated that various modifications and variations can be made without departing from the spirit and scope of the invention as defined in the appended claims.

What is claimed is:

1. A variable speed transmission comprising a first pulley assembly, a second pulley assembly, an elongated flexible endless member rotatably inter connecting said first and said second pulley assemblies, a first elongated member for mounting said first pulley assembly is mounted, a second elongated member for mounting said second pulley assembly, means connected to at least one of said pulley assemblies for varying the effective pitch radius of the pulley assembly where operational contact is made with said elongated flexible endless member and a flexible gear assembly operatively connected to at least one of said elongated members.

2. The variable speed transmission of claim 1 wherein said pulley assemblies each comprise a pair of wheels having radially tapered wheel faces that face toward each other.

3. The variable speed transmission of claim 2 wherein said means for varying the effective pitch radius of said pulley assembly comprises means for varying the distance between the opposing tapered wheel faces of the wheels of said pulley assembly.

4. The variable speed transmission of claim 3 wherein said means for varying the wheel face distance comprises a pair of pivotally connected control levers located to exert forces on the wheels of said pulley assembly.

5. The variable speed transmission of claim 4 wherein said means for varying the wheel face distance further comprises a control screw member threadably connected to said control levers.

6. The variable speed transmission of claim 3 wherein said elongated flexible endless member comprises a chain.

7. The variable speed transmission of claim 6 wherein the tapered wheel faces of the wheels of said pulley assemblies have radially extending grooves and wherein said chain has means for engaging said grooves at various pitch radii.

8. The variable speed transmission of claim 3 further comprising a hollow housing and wherein said pulley assemblies, elongated flexible endless member and said flexible gear assembly are located within said hollow housing.

9. The variable speed transmission of claim 8 wherein said flexible gear assembly has a deformable gear and a rotatable deforming assembly for deforming said deformable gear.

10. The variable speed transmission of claim 9 wherein said flexible gear assembly is operatively connected to at least one of said elongated members through said rotatable deforming assembly.

* * * * *